(12) United States Patent
Jeon et al.

(10) Patent No.: US 12,421,384 B2
(45) Date of Patent: Sep. 23, 2025

(54) TRANSPARENT THERMOPLASTIC RESIN AND METHOD OF PREPARING THE SAME

(71) Applicant: LG CHEM, LTD., Seoul (KR)

(72) Inventors: Jiyoon Jeon, Daejeon (KR); Yong Yeon Hwang, Daejeon (KR); Bong Keun Ahn, Daejeon (KR); Min Jung Kim, Daejeon (KR); Jangwon Park, Daejeon (KR); Eunji Lee, Daejeon (KR); Seyong Kim, Daejeon (KR)

(73) Assignee: LG CHEM, LTD.

( * ) Notice: Subject to any disclaimer, the term of this patent is extended or adjusted under 35 U.S.C. 154(b) by 767 days.

(21) Appl. No.: 17/765,888

(22) PCT Filed: Jul. 19, 2021

(86) PCT No.: PCT/KR2021/009218
§ 371 (c)(1),
(2) Date: Apr. 1, 2022

(87) PCT Pub. No.: WO2022/035071
PCT Pub. Date: Feb. 17, 2022

(65) Prior Publication Data
US 2022/0372269 A1    Nov. 24, 2022

(30) Foreign Application Priority Data

Aug. 11, 2020  (KR) .................. 10-2020-0100368
Jul. 13, 2021   (KR) .................. 10-2021-0091421

(51) Int. Cl.
*C08L 51/04*  (2006.01)
*C08L 33/10*  (2006.01)
(52) U.S. Cl.
CPC .............. *C08L 51/04* (2013.01); *C08L 33/10* (2013.01); *C08L 2203/30* (2013.01); *C08L 2205/02* (2013.01)

(58) Field of Classification Search
CPC ...... C08L 51/04; C08L 33/10; C08L 2203/30; C08L 2205/02; C08L 33/12; C08F 265/06
(Continued)

(56) References Cited

U.S. PATENT DOCUMENTS 4,885,335 A     12/1989  Gallucci et al.
2009/0012215 A1  1/2009  Wada et al.
(Continued)

FOREIGN PATENT DOCUMENTS

CN    101218295 A    7/2008
CN    103476861 A    12/2013
(Continued)

OTHER PUBLICATIONS

Paper with description of haze Cho, Donghwi, Chen, Haomin, Shin, Jonghwa and Jeon, Seokwoo. "Mechanoresponsive scatterers for high-contrast optical modulation" Nanophotonics, vol. 11, No. 11, 2022, pp. 2737-2762. https://doi.org/10.1515/nanoph-2021-0642 (Year: 2021).*

(Continued)

*Primary Examiner* — Heidi R Kelley
(74) *Attorney, Agent, or Firm* — Morgan, Lewis & Bockius LLP

(57) ABSTRACT

The present disclosure relates to a thermoplastic resin having excellent non-whitening properties, impact strength, gloss, and fluidity, and a method of preparing the thermoplastic resin. The thermoplastic resin includes an alkyl acrylate-alkyl methacrylate graft copolymer (A), or the copolymer (A) and a matrix resin (B) including one or more selected from the group consisting of an aromatic vinyl compound-vinyl cyanide compound-alkyl methacrylate copolymer and an alkyl methacrylate polymer. A transparency measured under a condition of 3 mm thickness is less than 5, the total content of the alkyl acrylate is 20 to 50% by (Continued)

weight, and an alkyl acrylate coverage value (X) as calculated by Equation 1 below is 65 or more:

$$X=\{(G-Y)/Y\}\times 100,\qquad \text{[Equation 1]}$$

wherein G represents the total gel content (%) of the thermoplastic resin, and Y represents the content of alkyl acrylate in the gel contained in the thermoplastic resin.

14 Claims, 1 Drawing Sheet

(58) Field of Classification Search
USPC .......................................................... 525/25
See application file for complete search history.

(56) References Cited

U.S. PATENT DOCUMENTS

| | | | |
|---|---|---|---|
| 2012/0264871 A1 | 10/2012 | Moon et al. | |
| 2013/0165577 A1* | 6/2013 | Jang | C08F 285/00 525/86 |
| 2014/0039104 A1 | 2/2014 | Yang et al. | |
| 2014/0142212 A1 | 5/2014 | Chu et al. | |
| 2014/0235749 A1* | 8/2014 | Kim | C08F 291/12 525/85 |
| 2016/0002455 A1* | 1/2016 | Chung | C08L 33/12 525/85 |
| 2016/0152806 A1 | 6/2016 | Park et al. | |
| 2016/0304711 A1 | 10/2016 | Cho et al. | |
| 2017/0088704 A1 | 3/2017 | Park | |
| 2017/0198132 A1 | 7/2017 | Choi et al. | |
| 2018/0134889 A1* | 5/2018 | Lee | C08F 279/02 |
| 2020/0140672 A1 | 5/2020 | Choi et al. | |
| 2021/0108070 A1 | 4/2021 | Park et al. | |
| 2022/0356340 A1 | 11/2022 | Park et al. | |
| 2023/0131897 A1 | 4/2023 | Jang et al. | |

FOREIGN PATENT DOCUMENTS

| | | | | |
|---|---|---|---|---|
| CN | 105658725 A | | 6/2016 | |
| CN | 110914361 A | | 3/2020 | |
| CN | 114514282 A | | 5/2022 | |
| DE | 813154 C | * | 9/1951 | ............ B01F 27/731 |
| EP | 4 006 102 A1 | | 6/2022 | |
| EP | 4 019 587 A1 | | 6/2022 | |
| JP | H0733470 B2 | | 4/1995 | |
| JP | 2002-060439 A | | 2/2002 | |
| JP | 2002-60439 A | | 2/2002 | |
| JP | 2006-335960 A | | 12/2006 | |
| JP | 2015-522084 A | | 8/2015 | |
| JP | 2021-523283 A | | 9/2021 | |
| JP | 2023-517203 A | | 4/2023 | |
| KR | 10-2004-0049066 A | | 6/2004 | |
| KR | 10-2011-0078044 A | | 7/2011 | |
| KR | 10-2012-0040771 A | | 4/2012 | |
| KR | 10-2013-0029826 A | | 3/2013 | |
| KR | 10-2014-0005510 A | | 1/2014 | |
| KR | 10-2015-0021481 A | | 3/2015 | |
| KR | 10-2015-0038845 A | | 4/2015 | |
| KR | 10-2015-0038975 A | | 4/2015 | |
| KR | 10-2015-0091198 A | | 8/2015 | |
| KR | 10-1656798 B1 | | 9/2016 | |
| KR | 10-2016-0123984 A | | 10/2016 | |
| KR | 10-2017-0039048 A | | 4/2017 | |
| KR | 10-2018-0131992 A | | 12/2018 | |

OTHER PUBLICATIONS

Recent discussion of kneading extruder design for thermoplastic processing. Paul G. Andersen, Coperion Corporation, Ramsey, NJ—Society of Polymer Engineers South Texas Region Newsletter, Nov. 2018 (Year: 2018).*
Extended European Search Report issued in corresponding European Patent Application No. 21 856 077.9, dated Jan. 3, 2023.
International Search Report and Written Opinion issued in corresponding International Patent Application No. PCT/KR2021/009218, dated Oct. 21, 2021.

* cited by examiner

[FIG. 1]
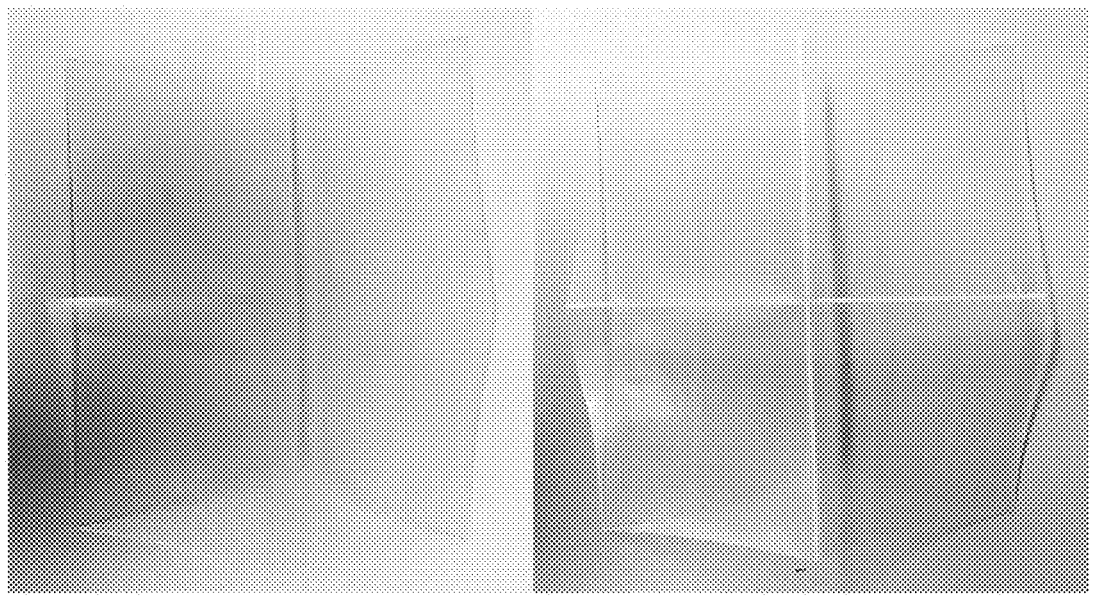
[FIG. 2]
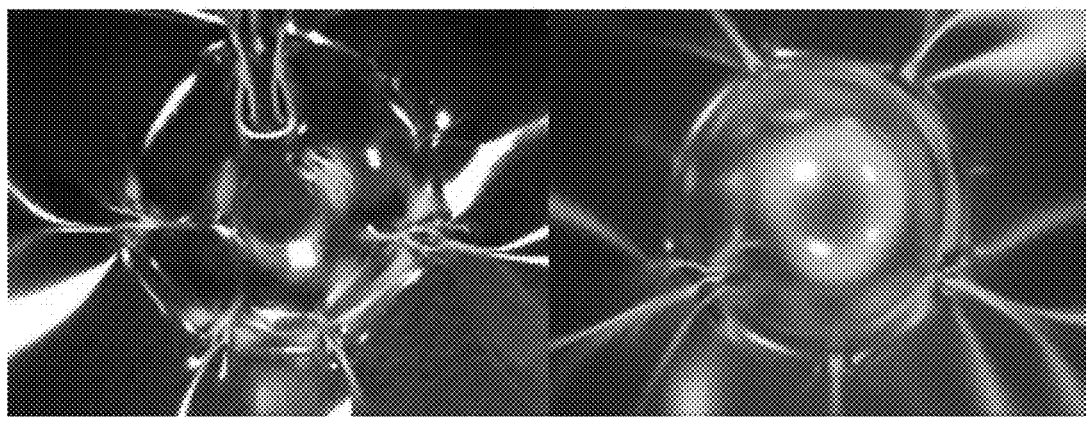

TRANSPARENT THERMOPLASTIC RESIN AND METHOD OF PREPARING THE SAME

CROSS-REFERENCE TO RELATED APPLICATIONS

This application claims priority to Korean Patent Application No. 10-2020-0100368, filed on Aug. 11, 2020, and Korean Patent Application No. 10-2021-0091421, re-filed on Jul. 13, 2021, based on the priority of the above patent, in the Korean Intellectual Property Office, the disclosures of each of which are incorporated herein by reference.

TECHNICAL FIELD

The present invention relates to a transparent thermoplastic resin. More particularly, the present invention relates to a transparent thermoplastic resin having excellent transparency, impact strength, gloss, and fluidity and excellent non-whitening properties, characterized in that whitening does not occur when bent or hit, and a method of preparing the thermoplastic resin.

BACKGROUND ART

Acrylonitrile-butadiene-styrene resins (hereinafter referred to as "ABS resins") based on conjugated diene rubber have excellent processability, mechanical properties, and appearance properties, and thus have been widely used in electric and electronic products, automobiles, small toys, furniture, construction materials, and the like. However, since ABS resins are based on butadiene rubber containing an unsaturated bond that is chemically unstable, ABS resins have very poor weather resistance due to aging of the rubber polymer by ultraviolet light. Thus, ABS resins are not suitable as outdoor materials.

To overcome these problems of ABS resins, acrylic copolymers typified by acrylate-styrene-acrylonitrile graft copolymers (hereinafter referred to as "ASA resins") without an ethylenically unsaturated bond have been used. ASA resins have excellent physical properties, such as processability, impact resistance, chemical resistance, and weather resistance, and thus have been used in various fields, such as materials for buildings, interior and exterior materials for automobiles and motorcycles, electric and electronic products, ships, leisure goods, and gardening goods. In addition, there is increasing demand for ASA resins.

In addition, as the importance of aesthetics increases in the market, research is being conducted to realize a luxurious appearance and excellent colorability and weather resistance by finishing the outer surfaces of substrates, such as ABS, PVC, and steel sheets, with ASA resins. Such a finishing material is mainly manufactured in the form of a film and then processed into a final product through a process such as bending or folding according to the shape of a substrate to which the finishing material is applied. However, due to the characteristics of a thermoplastic ASA resin, when the above-described finishing treatment is performed at room temperature, whitening occurs, thereby losing the original color of the resin and deteriorating aesthetics.

RELATED ART DOCUMENTS

Patent Documents

JP 1995-033470 B2

DISCLOSURE

Technical Problem

Therefore, the present invention has been made in view of the above problems, and it is one object of the present invention to provide a transparent thermoplastic resin having excellent transparency, impact strength, gloss, and fluidity and excellent non-whitening properties, characterized in that occurrence of whitening is suppressed even when bent or hit and a method of preparing the thermoplastic resin.

It is another object of the present invention to provide a molded article manufactured using the transparent thermoplastic resin of the present invention.

The above and other objects can be accomplished by the present invention described below.

Technical Solution

In accordance with an aspect of the present invention, the above and other objects can be accomplished by the provision of a thermoplastic resin, including: an alkyl acrylate-aromatic vinyl compound-vinyl cyanide compound graft copolymer (A), or an alkyl acrylate-aromatic vinyl compound-vinyl cyanide compound graft copolymer (A); and a matrix resin (B) including one or more selected from the group consisting of an aromatic vinyl compound-vinyl cyanide compound-alkyl methacrylate copolymer and an alkyl methacrylate polymer, wherein a transparency (haze value), measured according to ASTM D-1003 under a condition of 3 mm thickness, is less than 5%, a total content of the alkyl acrylate is 20 to 50% by weight, and an alkyl acrylate coverage value (X) as calculated by Equation 1 below is 65 or more:

$$X=\{(G-Y)/Y\}\times 100, \quad \text{[Equation 1]}$$

wherein G represents a total gel content (%) of the thermoplastic resin, and Y represents a content (% by weight) of alkyl acrylate in the gel of the thermoplastic resin.

In accordance with another aspect of the present invention, there is provided a thermoplastic resin including an alkyl acrylate-aromatic vinyl compound-vinyl cyanide compound graft copolymer (A), or an alkyl acrylate-aromatic vinyl compound-vinyl cyanide compound graft copolymer (A); and a matrix resin (B) including one or more selected from the group consisting of an aromatic vinyl compound-vinyl cyanide compound-alkyl methacrylate copolymer and an alkyl methacrylate polymer, wherein a transparency (haze value), measured according to ASTM D-1003 under a condition of 3 mm thickness, is less than 5%, a total content of the alkyl acrylate is 20 to 50% by weight, and when elution is performed using acetone, an elution amount of alkyl acrylate is 0.1% by weight or more.

In accordance with another aspect of the present invention, there is provided a thermoplastic resin including an alkyl acrylate-aromatic vinyl compound-vinyl cyanide compound graft copolymer (A), or an alkyl acrylate-aromatic vinyl compound-vinyl cyanide compound graft copolymer (A) and a matrix resin (B) including one or more selected from the group consisting of an aromatic vinyl compound-vinyl cyanide compound-alkyl methacrylate copolymer and an alkyl methacrylate polymer, wherein a transparency (haze value), measured according to ASTM D-1003 under a condition of 3 mm thickness, is less than 5%, a total content of the alkyl acrylate is 20 to 50% by weight, and the copolymer (A) includes, based on 100% by weight in total of the copolymer (A), 30 to 50% by weight of alkyl acrylate rubber (a-1) having a DLS average particle diameter of 50 to 120 nm or a TEM average particle diameter of 32.5 to 84 nm; and 50 to 70% by weight of an aromatic vinyl compound-vinyl cyanide compound copolymer (a-2).

Preferably, the thermoplastic resin may include 50 to 100% by weight of the alkyl acrylate-aromatic vinyl compound-vinyl cyanide compound graft copolymer (A) and 0 to 50% by weight of the matrix resin (B) including one or more selected from the group consisting of an aromatic vinyl compound-vinyl cyanide compound-alkyl methacrylate copolymer and an alkyl methacrylate polymer.

Preferably, when elution of the thermoplastic resin is performed using acetone, an elution amount of alkyl acrylate may be 0.1% by weight or more.

Preferably, based on 100% by weight in total of the copolymer (A), the copolymer (A) may include 30 to 50% by weight of an alkyl acrylate rubber (a-1) having a DLS average particle diameter of 50 to 120 nm or a TEM average particle diameter of 32.5 to 84 nm; and 50 to 70% by weight of an aromatic vinyl compound-vinyl cyanide compound copolymer (a-2).

Preferably, the copolymer (A) may have a grafting degree of 60 to 150%, and the copolymer (b-1) may have a weight average molecular weight of 40,000 to 120,000 g/mol.

Preferably, the rubber (a-1) may further include an aromatic vinyl compound.

Preferably, when the rubber (a-1) further includes an aromatic vinyl compound, the aromatic vinyl compound may be included in an amount of 0.1 to 25% by weight based on 100% by weight in total of the rubber (a-1).

Preferably, the copolymer (a-2) may further include an alkyl acrylate. In this case, the copolymer (a-2) may be a copolymer including 55 to 85% by weight of an aromatic vinyl compound, 10 to 30% by weight of a vinyl cyanide compound, and 0.1 to 20% by weight of an alkyl acrylate based on 100% by weight in total of the copolymer (a-2).

Preferably, a refractive index difference (according to ASTM D542) between a sol and a gel of the thermoplastic resin under a condition of using acetone may be less than 0.025.

Preferably, when the thermoplastic resin is extruded to obtain a film having a thickness of 0.15 mm, and a weight having a weight of 1 kg is vertically dropped onto the film from a height of 100 mm at 23° C. using a Gardner impact tester, a difference in haze values measured before and after impact according to ASTM D1003-95 for an area impacted by the weight may be 10 or less.

In accordance with still another aspect of the present invention, there is provided a method of preparing a thermoplastic resin, the method including a step of kneading and extruding an alkyl acrylate-aromatic vinyl compound-vinyl cyanide compound graft copolymer (A), or an alkyl acrylate-aromatic vinyl compound-vinyl cyanide compound graft copolymer (A); and a matrix resin (B) including one or more selected from the group consisting of an aromatic vinyl compound-vinyl cyanide compound-alkyl methacrylate copolymer and an alkyl methacrylate polymer, wherein a transparency (haze), measured according to ASTM D-1003 under a condition of 3 mm thickness, of the thermoplastic resin is less than 5%, a total content of the alkyl acrylate in the thermoplastic resin is 20 to 50% by weight, and an alkyl acrylate coverage value (X), as calculated by Equation 1 below, of the thermoplastic resin is 65 or more:

$$X=\{(G-Y)/Y\}\times 100,$$ [Equation 1]

wherein G represents a total gel content (%) of the thermoplastic resin, and Y represents a content (% by weight) of alkyl acrylate in the gel of the thermoplastic resin.

Preferably, the graft copolymer (A) may be prepared by a method including a step of emulsion polymerization of 100 parts by weight in total of a monomer mixture including 30 to 50% by weight of alkyl acrylate rubber having a DLS average particle diameter of 50 to 120 nm or a TEM average particle diameter of 32.5 to 84 nm and 50 to 70% by weight of an aromatic vinyl compound and a vinyl cyanide compound.

In accordance with yet another aspect of the present invention, provided is a molded article including the thermoplastic resin of the present invention.

Preferably, the molded article may be a finishing material.

Advantageous Effects

As apparent from the foregoing, the present invention advantageously provides a thermoplastic resin having excellent transparency, impact strength, gloss, and fluidity and excellent non-whitening properties, characterized in that occurrence of whitening is suppressed even when bent or hit and a method of preparing the thermoplastic resin. According to the present invention, the properties of the thermoplastic resin can be implemented by adjusting a refractive index difference between a sol and a gel of the resin, the particle diameter, content, grafting degree and molecular weight of rubber, a gel content of the resin, and the like.

DESCRIPTION OF DRAWINGS

FIG. 1 includes images taken after bending, in the Md and Td directions, films manufactured in an example (left image) and a comparative example (right image) to check whether whitening occurs.

FIG. 2 includes images taken after hitting, using a Gardner impact tester, films manufactured in an example (left image) and a comparative example (right image) to check whether whitening occurs.

BEST MODE

Hereinafter, a thermoplastic resin of the present invention will be described in detail.

The present inventors conducted studies to develop a transparent ASA resin capable of providing a finishing material having a luxurious appearance. As a result of such study, the present inventors confirmed that transparency is improved by adjusting a refractive index difference between a sol and a gel of a resin, and non-whitening properties are significantly improved when formation of voids due to cracks is minimized by reducing the distance between rubber particles and increasing a grafting degree up to a predetermined range. Based on these results, the present inventors conducted further studies to complete the present invention.

In this description, a resin does not mean only a single (co)polymer, and may include two or more (co)polymers as main components.

In this description, the composition ratio of a (co)polymer may mean the content of units constituting the (co)polymer, or may mean the content of units fed during polymerization of the (co)polymer.

The thermoplastic resin of the present invention may include an alkyl acrylate-aromatic vinyl compound-vinyl cyanide compound graft copolymer (A), or an alkyl acrylate-aromatic vinyl compound-vinyl cyanide compound graft copolymer (A); and a matrix resin (B) including one or more selected from the group consisting of an aromatic vinyl compound-vinyl cyanide compound-alkyl methacrylate copolymer and an alkyl methacrylate polymer, wherein a total content of the alkyl acrylate may be 20 to 50% by weight, a transparency measured according to ASTM D-1003 under a condition of 3 mm thickness is less than 5, and an alkyl acrylate coverage value (X) as calculated by Equation 1 below is 65 or more. In this case, transparency, impact resistance, weather resistance, and molding processability are excellent. In addition, whitening does not occur when bent or hit. That is, non-whitening properties are excellent.

$$X=\{(G-Y)/Y\}\times 100 \quad \text{[Equation 1]}$$

In Equation 1, G represents the total gel content (%) of the thermoplastic resin, and Y represents the content (% by weight) of alkyl acrylate in the gel of the thermoplastic resin.

In addition, as another example, the thermoplastic resin of the present invention may include 50 to 100% by weight of a graft copolymer (A) including an alkyl acrylate, an aromatic vinyl compound, and a vinyl cyanide compound; and 0 to 50% by weight of a matrix resin (B) including one or more selected from the group consisting of an aromatic vinyl compound-vinyl cyanide compound-alkyl methacrylate copolymer and an alkyl methacrylate polymer, wherein an X value as calculated by Equation 1 below is 65% or more, and a transparency measured under a condition of 3 mm thickness is less than 5. In this case, transparency, impact resistance, weather resistance, and molding processability are excellent, and whitening does not occur when bent, indicating that non-whitening properties are excellent.

$$X(\%)=\{(G-Y)/Y\}\times 100 \quad \text{[Equation 1]}$$

In Equation 1, G represents the total gel content (%) of the thermoplastic resin, and Y represents the content (% by weight) of alkyl acrylate in the gel of the thermoplastic resin.

As another example, the thermoplastic resin of the present invention may include 50 to 100% by weight of an alkyl acrylate-aromatic vinyl compound-vinyl cyanide compound graft copolymer (A); and 0 to 50% by weight of a matrix resin (B) including one or more selected from the group consisting of an aromatic vinyl compound-vinyl cyanide compound-alkyl methacrylate copolymer and an alkyl methacrylate polymer, wherein the total content of the alkyl acrylate included in the thermoplastic resin is 20 to 50% by weight, and a refractive index difference (according to ASTM D542) between sol and gel under a condition of using acetone is less than 0.025. In this case, transparency, impact resistance, weather resistance, and molding processability are excellent, and excellent non-whitening properties are provided because whitening does not occur when bent.

In addition, as another example, the thermoplastic resin of the present invention may include 50 to 100% by weight of an alkyl acrylate-aromatic vinyl compound-vinyl cyanide compound graft copolymer (A); and 0 to 50% by weight of a matrix resin (B) including one or more selected from the group consisting of an aromatic vinyl compound-vinyl cyanide compound-alkyl methacrylate copolymer and an alkyl methacrylate polymer, wherein a transparency (haze value) measured according to ASTM D-1003 under a condition of 3 mm thickness is less than 5%, the total content of the alkyl acrylate is 20 to 50% by weight, and an elution amount of alkyl acrylate using acetone is 0.1% by weight or more. In this case, transparency, impact resistance, weather resistance, and molding processability are excellent, and excellent non-whitening properties are provided because whitening does not occur when bent.

In addition, as another example, the thermoplastic resin of the present invention may include 50 to 100% by weight of an alkyl acrylate-aromatic vinyl compound-vinyl cyanide compound graft copolymer (A); and 0 to 50% by weight of a matrix resin (B) including one or more selected from the group consisting of an aromatic vinyl compound-vinyl cyanide compound-alkyl methacrylate copolymer and an alkyl methacrylate polymer, wherein a transparency (haze value) measured according to ASTM D-1003 under a condition of 3 mm thickness is less than 5%, the total content of the alkyl acrylate is 20 to 50% by weight, and the copolymer (A) includes 30 to 50% by weight of an alkyl acrylate rubber (a-1) having a DLS average particle diameter of 50 to 120 nm or a TEM average particle diameter of 32.5 to 84 nm; and 50 to 70% by weight of an aromatic vinyl compound-vinyl cyanide compound copolymer (a-2), based on 100% by weight of the copolymer (A). In this case, transparency, impact resistance, weather resistance, and molding processability are excellent, and excellent non-whitening properties are provided because whitening does not occur when bent.

In this description, when measuring gel content, 30 g of acetone is added to 0.5 g of dry powder of a thermoplastic resin, agitation is performed at 210 rpm at room temperature for 12 hours using a shaker (SKC-6075, Lab Companion Co.), centrifugation is performed at 18,000 rpm at 0° C. for 3 hours using a centrifuge (Supra R30, Hanil Science Co.) to separate only insoluble matter that is not dissolved in acetone, and the separated insoluble matter is dried in a forced circulation manner at 85° C. for 12 hours using a forced convection oven (OF-12GW, Lab Companion Co.). Then, the weight of the dried insoluble matter is measured, and gel content is calculated by Equation 2 below.

$$\text{Gel content}(\%)=\{\text{Weight of insoluble matter (gel)/Weight of sample}\}\times 100 \quad \text{[Equation 2]}$$

In this description, when measuring grafting degree, 30 g of acetone is added to 0.5 g of dry powder of a graft polymer, agitation is performed at 210 rpm at room temperature for 12 hours using a shaker (SKC-6075, Lab Companion Co.), centrifugation is performed at 18,000 rpm at 0° C. for 3 hours using a centrifuge (Supra R30, Hanil Science Co.) to separate only insoluble matter that is not dissolved in acetone, and the separated insoluble matter is dried in a forced circulation manner at 85° C. for 12 hours using a forced convection oven (OF-12GW, Lab Companion Co.). Then, the weight of the dried insoluble matter is measured, and grafting degree is calculated by Equation 3 below.

$$\text{Grafting degree}(\%)=[\text{Weight (g) of grafted monomers/Weight (g) of rubber}]\times 100 \quad \text{[Equation 3]}$$

In Equation 3, the weight of grafted monomers is a value obtained by subtracting the weight (g) of rubber from the weight of insoluble matter (gel) obtained by dissolving a graft copolymer in acetone and performing centrifugation, and the weight (g) of rubber is the amount of rubber components theoretically included in the graft copolymer powder.

In this description, DLS average particle diameter may be measured by dynamic light scattering, and specifically, may be measured as an intensity value using a sample in the form of latex and using a particle size analyzer (Nicomp CW380, PPS Co.) in a Gaussian mode. As a particular example, 0.1 g of latex having a solids content of 35 to 50% by weight is diluted with 100 g of deionized water to prepare a sample, and the DLS average particle diameter of the sample may be measured at 23° C. using a particle size analyzer (Nicomp CW380, PPS Co.) in a measurement method of using an auto-dilution manner and flow cells and in a measurement mode of dynamic light scattering/intensity 300 kHz/intensity-weight Gaussian analysis.

In this description, TEM average particle diameter may be measured by transmission electron microscope (TEM) analysis. Specifically, the TEM average particle diameter refers to a value obtained by numerically measuring particle size on a high magnification image of a TEM and averaging the measurement results. In this case, a specific measurement example is as follows:

Sample preparation: Thermoplastic resin pellets prepared using an extrusion kneader.
Sample pretreatment: Trimming (23° C.)→hydrazine treatment (72° C., 5 days)→sectioning (−120° C.)→$OsO_4$ vapor staining (2 hours)
Analyzer: TEM (JEM-1400, Jeol Co.)
Analysis conditions: Acc. Volt: 120 kV, spot size: 1 (×10K, ×25K, ×50K)
Size (average particle diameter) measurement: An average value of the largest diameters of each of particles in the top 10% of a particle diameter distribution is measured.

Here, the average value of the largest diameters of each of particles in the top 10% of a particle diameter distribution may mean an arithmetic mean value of the top 10% of the largest diameters of each of 100 or more particles randomly selected from a TEM image.

Hereinafter, each component constituting the thermoplastic resin of the present invention will be described in detail.

(A) Copolymer

The copolymer (A) is a graft copolymer including an alkyl acrylate, an aromatic vinyl compound, and a vinyl cyanide compound, and is included in an amount of 50 to 100% by weight based on 100% by weight in total of the thermoplastic resin.

For example, based on 100% by weight in total of the copolymer (A), the copolymer (A) may include 30 to 50% by weight, preferably 35 to 50% by weight of alkyl acrylate rubber (a-1) having a DLS average particle diameter of 50 to 120 nm or a TEM average particle diameter of 32.5 to 84 nm and 50 to 70% by weight, preferably 50 to 65% by weight of an aromatic vinyl compound-vinyl cyanide compound copolymer (a-2). Within this range, gloss, non-whitening properties, and impact resistance are excellent. The rubber (a-1) may have a DLS average particle diameter of, preferably, 50 to 110 nm and a TEM average particle diameter of, preferably, 35 to 80 nm, more preferably 40 to 78 nm. Within this range, excellent colorability and weather resistance are provided without lowering the mechanical strength.

In this description, the graft copolymer (A) including the alkyl acrylate rubber (a-1) and the aromatic vinyl compound-vinyl cyanide compound copolymer (a-2) refers to a graft copolymer (A) including the alkyl acrylate rubber (a-1) and the aromatic vinyl compound-vinyl cyanide compound copolymer (a-2) surrounding the alkyl acrylate rubber (a-1). In addition, the graft copolymer (A) may be represented as a graft copolymer (A) formed by graft-polymerizing an aromatic vinyl compound and a vinyl cyanide compound onto the alkyl acrylate rubber (a-1).

For example, the copolymer (A) may have a grafting degree of 60 to 150% and, the copolymer (a-2) may have a weight average molecular weight of 40,000 to 120,000 g/mol. Within these ranges, molding processability and non-whitening properties may be excellent. The copolymer (A) preferably has a grafting degree of 60 to 140%, more preferably 62 to 130%. Within this range, non-whitening properties may be excellent without deterioration in impact resistance and molding processability. The copolymer (a-2) preferably has a weight average molecular weight of 50,000 to 110,000 g/mol, more preferably 60,000 to 110,000 g/mol. Within this range, molding processability and non-whitening properties may be excellent without deterioration in impact resistance.

In this description, unless otherwise defined, weight average molecular weight may be measured using gel permeation chromatography (GPC, Waters Breeze). As a specific example, the weight average molecular weight may be measured using tetrahydrofuran (THF) as an eluate through gel permeation chromatography (GPC, Waters Breeze). In this case, weight average molecular weight is obtained as a relative value to a polystyrene (PS) standard sample. As a specific measurement example, the weight average molecular weight may be measured under conditions of solvent: THF, column temperature: 40° C., flow rate: 0.3 ml/min, sample concentration: 20 mg/ml, injection amount: 5 μl, column model: 1×PLgel 10 μm MiniMix-B (250×4.6 mm)+1×PLgel 10 μm MiniMix-B (250×4.6 mm)+1×PLgel 10 μm MiniMix-B Guard (50×4.6 mm), equipment name: Agilent 1200 series system, refractive index detector: Agilent G1362 RID, RI temperature: 35° C., data processing: Agilent ChemStation S/W, and test method (Mn, Mw and PDI): OECD TG 118.

For example, the rubber (a-1) may further include an aromatic vinyl compound. In this case, chemical resistance and impact resistance may be further improved. For example, the content of the aromatic vinyl compound included in the rubber (a-1) may be 0.1 to 25% by weight, preferably 2 to 23% by weight, more preferably 5 to 20% by weight based on 100% by weight in total of the rubber (a-1). Within this range, desired effects may be sufficiently obtained without deterioration in other physical properties.

For example, the acrylate rubber may be prepared by emulsion polymerization of an acrylate-based compound. As a specific example, the acrylate rubber may be prepared by mixing an acrylate-based compound, an emulsifier, an initiator, a grafting agent, a crosslinking agent, an electrolyte, and a solvent and performing emulsion polymerization of the mixture. In this case, grafting efficiency may increase, thereby improving physical properties such as impact resistance.

For example, the copolymer (a-2) may further include an alkyl acrylate. In this case, the physical property balance of impact strength, weather resistance, molding processability, and non-whitening properties may be excellent. For example, based on 100% by weight in total of the copolymer (a-2), the copolymer (a-2) may include 55 to 85% by weight of an aromatic vinyl compound, 10 to 30% by weight of a vinyl cyanide compound, and 0.1 to 20% by weight of an alkyl acrylate, preferably 60 to 80% by weight of an aromatic vinyl compound, 13 to 26% by weight of a vinyl cyanide compound, and 3 to 20% by weight of an alkyl acrylate, more preferably 65 to 78% by weight of an aromatic vinyl compound, 15 to 22% by weight of a vinyl cyanide compound, and 5 to 17% by weight of an alkyl acrylate. Within this range, impact strength and weather resistance may be further improved.

For example, the rubber (a-1) may include a rubber seed.

For example, based on 100% by weight of the copolymer (A), the rubber seed may be prepared by polymerizing 1 to 20% by weight, preferably 2 to 15% by weight, more preferably 3 to 10% by weight of one or more monomers selected from the group consisting of an aromatic vinyl compound, a vinyl cyanide compound, and an alkyl acrylate. Within this range, impact strength, weather resistance, and physical property balance are excellent.

As a specific example, based on 100 parts by weight of units constituting the copolymer (A), the rubber seed may be prepared by adding 0.01 to 3 parts by weight of a crosslinking agent, 0.01 to 3 parts by weight of an initiator, and 0.01 to 5 parts by weight of an emulsifier to monomers including an aromatic vinyl compound and an alkyl acrylate and performing polymerization. Within this range, a polymer having an even size may be prepared within a short time, and physical properties such as weather resistance and impact strength may be further improved.

As another specific example, based on 100 parts by weight of units constituting the copolymer (A), the rubber seed may be prepared by adding 0.1 to 1 part by weight of a crosslinking agent, 0.01 to 1 part by weight of an initiator, and 0.1 to 3.0 parts by weight of an emulsifier to monomers including an aromatic vinyl compound and an alkyl acrylate and performing polymerization. Within this range, a polymer having an even size may be prepared within a short time, and physical properties such as weather resistance and impact strength may be further improved.

For example, based on 100 parts by weight of units constituting the copolymer (A), the copolymer (A) may be prepared by a method including a step (A-1) of preparing a rubber seed by polymerizing a mixture containing 0.001 to 1 part by weight of an electrolyte, 0.01 to 3 parts by weight of a crosslinking agent, 0.01 to 3 parts by weight of an initiator, and 0.01 to 5 parts by weight of an emulsifier with 1 to 20 parts by weight of an alkyl acrylate compound and optionally an aromatic vinyl compound; a step (A-2) of preparing a rubber core by polymerizing, in the presence of the rubber seed, a mixture containing 25 to 55 parts by weight of an alkyl acrylate compound and optionally an aromatic vinyl compound, 0.01 to 1 part by weight of a crosslinking agent, 0.01 to 3 parts by weight of an initiator, and 0.01 to 5 parts by weight of an emulsifier; and a step (A-3) of preparing a graft shell by adding 0.01 to 3 parts by weight of a crosslinking agent, 0.01 to 3 parts by weight of an initiator, 0.1 to 2 parts by weight of an emulsifier, and 0.01 to 1 part by weight of an activator to 40 to 70 parts by weight of one or more compounds selected from the group consisting of an aromatic vinyl compound and a vinyl cyanide compound in the presence of the rubber core and mixing the components. In this case, the physical property balance of impact resistance, weather resistance, molding processability, and non-whitening properties are excellent.

In this description, for example, the alkyl acrylate compound may be an alkyl acrylate containing an alkyl group having 1 to 15 carbon atoms, and as a specific example, may include one or more selected from the group consisting of methyl acrylate, ethyl acrylate, propyl acrylate, butyl acrylate, 2-ethylbutyl acrylate, octyl acrylate, 2-ethylhexyl acrylate, hexyl acrylate, heptyl acrylate, n-pentyl acrylate, and lauryl acrylate. As another example, the alkyl acrylate compound preferably is an alkyl acrylate containing a chain alkyl group having 1 to 4 carbon atoms, more preferably butyl acrylate.

In this description, for example, the aromatic vinyl compound may include one or more selected from the group consisting of styrene, α-methylstyrene, o-methylstyrene, p-methylstyrene, m-methylstyrene, ethylstyrene, isobutyl styrene, t-butyl styrene, o-bromostyrene, p-bromostyrene, m-bromostyrene, o-chlorostyrene, p-chlorostyrene, m-chlorostyrene, vinyl toluene, vinyl xylene, fluorostyrene, and vinylnaphthalene, preferably one or more selected from the group consisting of styrene and α-methylstyrene, still more preferably styrene. In this case, processability may be excellent due to proper fluidity, and mechanical properties such as impact resistance may be excellent.

In this description, for example, the vinyl cyanide compound may include one or more selected from the group consisting of acrylonitrile, methylacrylonitrile, ethylacrylonitrile, and isopropylacrylonitrile. Preferably, the vinyl cyanide compound may be acrylonitrile.

In this description, unless otherwise defined, crosslinking agents commonly used in the art to which the present invention pertains may be used in the present invention without particular limitation. For example, one or more compounds including an unsaturated vinyl group and capable of serving as a crosslinking agent, or one or more compounds including two or more unsaturated vinyl groups having different reactivities may be used as the crosslinking agent of the present invention. As a specific example, the crosslinking agent of the present invention may include one or more selected from the group consisting of polyethyleneglycol diacrylate, polyethyleneglycol dimethacrylate, polypropyleneglycol diacrylate, polypropyleneglycol dimethacrylate, ethyleneglycol diacrylate, ethyleneglycol dimethacrylate, divinylbenzene, diethyleneglycol dimethacrylate, triethyleneglycol dimethacrylate, 1,3-butanediol dimethacrylate, hexanediol propoxylate diacrylate, neopentylglycol dimethacrylate, neopentylglycol ethoxylate diacrylate, neopentylglycol propoxylate diacrylate, trimethylolpropane trimethacrylate, trimethylolmethane triacrylate, trimethylolpropane ethoxylate triacrylate, trimethylolpropane propoxylate triacrylate, pentaerythritol ethoxylate triacrylate, pentaerythritol propoxylate triacrylate, vinyltrimethoxysilane, allyl methacrylate, triallyl isocyanurate, triallyl amine, and diallyl amine, without being limited thereto.

In this description, for example, a mixture containing one or more selected from the group consisting of KCl, NaCl, $KHCO_3$, $NaHCO_3$, $K_2CO_3$, $Na_2CO_3$, $KHSO_3$, $NaHSO_3$, $K_4P_2O_7$, $Na_4P_2O_7$, $K_3PO_4$, $Na_3PO_4$, $K_2HPO_4$, $Na_2HPO_4$, KOH, NaOH, and $Na_2S_2O_7$ may be used as the electrolyte, without being limited thereto.

In this description, initiators commonly used in the art to which the present invention pertains may be used in the present invention without particular limitation. For example, radical initiators such as water-soluble initiators and fat-soluble initiators may be used, and a mixture containing one or more of the radical initiators may be used.

The water-soluble initiator may include one or more selected from the group consisting of inorganic peroxides including sodium persulfate, potassium persulfate, ammonium persulfate, potassium superphosphate, and hydrogen peroxide, without being limited thereto.

The fat-soluble initiator may include one or more selected from the group consisting of dialkyl peroxides, diacyl peroxides, diperoxyketals, hydroperoxides, peroxyesters, peroxydicarbonates, and azo compounds.

As a more specific example, the fat-soluble initiator may include one or more selected from the group consisting of organic peroxides such as cumene hydroperoxide, p-menthane hydroperoxide, di-t-butyl peroxide, dicumyl peroxide, t-butylcumyl peroxide, di-t-amyl peroxide, 2,5-dimethyl-2,5-di(t-butylperoxy)-hexane, 1,1,-di(t-butylperoxy)-3,3,5-trimethylcyclohexane, 1,1-di(t-butylperoxy)-cyclohexane, 1,1-di(t-amylperoxy)-cyclohexane, ethyl 3,3-di(t-amylperoxy)-butyrate, diisopropylbenzene mono-hydroperoxide, t-amyl hydroperoxide, t-butyl hydroperoxide, t-butyl peroxyneodecanoate, t-butyl peroxypivalate, di-(3,5,5-trimethylhexanoyl)-peroxide, t-butyl peroxy-2-ethylhexanoate, t-butyl peroxy-3,5,5-trimethylhexanoate, t-amyl peroxy neodecanoate, t-amyl peroxypivalate, t-amyl peroxy-2-ethylhexanoate, t-butyl peroxyacetate, t-butyl peroxybenzoate, t-amyl peroxy 2-ethylhexyl carbonate, t-butyl peroxy 2-ethylhexyl carbonate, t-butyl peroxy isopropyl monocarbonate, t-butyl peroxy maleic acid, cumyl peroxyneodecanoate, 1,1,3,3,-tetramethylbutyl peroxy neodecanoate, 1,1,3,3,-tetramethylbutyl peroxy 2-ethylhexanoate, di-2-ethylhexyl peroxydicarbonate, 3-hydroxy-1,1-dimethylbutylperoxy neodecanoate, acetyl peroxide, isobutyl peroxide, octanoyl peroxide, dibenzoyl peroxide, dilauroyl peroxide, 3,5,5-trimethylhexanoyl peroxide, and t-butyl peroxy isobutyrate; azobisisobutyronitrile; azobismethylbutyronitrile; azobis-4-methoxy-2,4-dimethylvaleronitrile; azobis-2,4-dimethylvaleronitrile; azobis cyclohexanecarbonitrile; and azobis isobutyric acid methyl, without being limited thereto.

In the step of preparing a rubber seed, the step of preparing a rubber core, and the step of preparing a copolymer shell (graft shell), in addition to the initiator, an oxidation-reduction catalyst may be optionally used to further accelerate initiation reaction. For example, the oxidation-reduction catalyst may include one or more selected from the group consisting of sodium pyrophosphate, dextrose, ferrous sulfide, sodium sulfite, sodium formaldehyde sulfoxylate, sodium ethylenediaminetetraacetate, sulfonatoacetic acid metal salts, and sulfinatoacetic acid metal salts, without being limited thereto.

In at least one step of the step of preparing a rubber seed, the step of preparing a rubber core, and the step of preparing a copolymer shell (graft shell), in addition to the polymerization initiator, an activator is preferably used to promote initiation reaction of peroxides. The activator preferably includes one or more selected from the group consisting of sodium formaldehyde sulfoxylate, sodium ethylenediamine tetraacetate, ferrous sulfate, dextrose, sodium pyrrolate, sodium sulfite, sulfonatoacetic acid metal salt, and sulfinatoacetic acid metal salt.

Based on 100 parts by weight in total of monomers added to prepare the copolymer (A), the activator may be added in an amount of 0.01 to 3 parts by weight or 0.01 to 1 part by weight. Within this range, polymerization rate may increase.

In the step of preparing a seed and the step of preparing a core, as a method of feeding monomers, batch feed or continuous feed may be used alone, or two methods may be used in combination.

In this description, "continuous feed" means that components are not added in a batch. For example, according to continuous feed, components may be fed for 10 minutes or more, 30 minutes or more, 1 hour or more, preferably 2 hours or more within a polymerization time range in drop by drop, little by little, step by step, or continuous flow.

In this description, emulsifiers commonly used in the art to which the present invention pertains may be used in the present invention without particular limitation. For example, the emulsifier of the present invention may include one or more selected from the group consisting of low-molecular weight carboxylates having 20 or fewer carbon atoms or 10 to 20 carbon atoms, such as rosin acid salt, lauric acid salt, oleic acid salt, and stearic acid salt; alkyl sulfosuccinates having 20 or fewer carbon atoms or 10 to 20 carbon atoms or derivatives thereof; alkyl sulfates or sulfonates having 20 or fewer carbon atoms or 10 to 20 carbon atoms; polyfunctional carboxylic acids having 20 to 60, 20 to 55, or 30 to 55 carbon atoms and having two or more carboxy groups, preferably 2 to 3 carboxy groups, or salts thereof; and one or more phosphoric acid salts selected from the group consisting of mono alkyl ether phosphates and dialkyl ether phosphates.

As another example, the emulsifier may include one or more selected from the group consisting of reactive emulsifiers selected from the group consisting of sulfoethyl methacrylate, 2-acrylamido-2-methylpropane sulfonic acid, sodium styrene sulfonate, sodium dodecyl allyl sulfosuccinate, a copolymer of styrene and sodium dodecyl allyl sulfosuccinate, polyoxyethylene alkylphenyl ether ammonium sulfates, C16-18 alkenyl succinic acid di-potassium salt, and sodium methallyl sulfonate; and non-reactive emulsifiers selected from the group consisting of alkyl aryl sulfonate, alkali methyl alkyl sulfate, sulfonated alkyl esters, fatty acid soap, and alkali salts of rosin acid.

As another example, the derivatives of C12 to C18 alkyl sulfosuccinate metal salts, C12 to C20 alkyl sulfate esters, or the derivatives of sulfonic acid metal salts may be used as the emulsifier. For example, the derivatives of C12 to C18 alkyl sulfosuccinate metal salts may include sodium or potassium salts of dicyclohexyl sulfonate, dihexyl sulfosuccinate, and dioctyl sulfosuccinate, and the C12 to C20 alkyl sulfate esters or the sulfonic acid metal salts may include alkyl sulfate metal salts such as sodium lauric sulfate, sodium dodecyl sulfate, sodium dodecyl benzene sulfate, sodium octadecyl sulfate, sodium oleic sulfate, potassium dodecyl sulfate, and potassium octadecyl sulfate. The emulsifiers may be used alone or in combination thereof.

In this description, a derivative of a compound refers to a substance obtained by substituting at least one of hydrogen and a functional group of the compound with another type of group such as an alkyl group or a halogen group.

In this description, when preparing the copolymer (A), a molecular weight modifier may be optionally included, and then emulsion polymerization may be performed. Based on 100 parts by weight of units constituting the copolymer (A), the molecular weight modifier may be included in an amount of 0.01 to 2 parts by weight, 0.05 to 2 parts by weight, or 0.05 to 1 part by weight. Within this range, a polymer having a desired molecular weight may be easily prepared.

For example, the molecular weight modifier may include one or more selected from the group consisting of mercaptans such as α-methyl styrene dimer, t-dodecyl mercaptan, n-dodecyl mercaptan, and octyl mercaptan; halogenated hydrocarbons such as carbon tetrachloride, methylene chloride, and methylene bromide; and sulfur-containing compounds such as tetra ethyl thiuram disulfide, dipentamethylene thiuram disulfide, and diisopropylxanthogen disulfide, and preferably includes mercaptan compounds such as tert-dodecylmercaptan, without being limited thereto.

When emulsion polymerization is performed, polymerization temperature is not particularly limited. In general, emulsion polymerization may be performed at 50 to 85° C., preferably 60 to 80° C.

For example, the copolymer latex (A) prepared in the above step may have a coagulum content of 1% or less, preferably 0.5% or less, still more preferably 0.1% or less. Within this range, the productivity of a resin may be increased, and mechanical strength and appearance properties may be improved.

In this description, the weight of coagulum produced in a reactor, the total weight of rubber, and the weight of monomers are measured, and coagulum content (%) is calculated by Equation 4 below.

Solid coagulum(%)=[Weight (g) of coagulum produced in reactor/Total weight (g) of rubber and monomers]×100     [Equation 4]

For example, the latex of the copolymer (A) may be prepared in the form of powder through a conventional process including coagulation, washing, and drying. As a specific example, a metal salt or an acid is added, coagulation is performed at 60 to 100° C., and aging, dehydration, washing, and drying are performed to prepare the latex of the copolymer (A) in the form of powder, but the present invention is not limited thereto.

Other conditions not specified in the method for preparing the above-described copolymer (A), i.e., polymerization conversion rate, reaction pressure, reaction time, gel content, etc., are not particularly limited when the conditions are within the ranges commonly used in the technical field to which the present invention pertains. The above conditions may be appropriately selected and used when necessary.

In this description, "%" means "% by weight" unless defined otherwise.

(B) Matrix Resin

Based on 100% by weight in total of the thermoplastic resin of the present invention, the thermoplastic resin includes 0 to 50% by weight of a matrix resin including one or more selected from the group consisting of an aromatic vinyl compound-vinyl cyanide compound-alkyl methacrylate copolymer and an alkyl methacrylate polymer. When the matrix resin (B) is included in the thermoplastic resin, mechanical properties and molding processability may be further improved.

The matrix resin (B) is a hard matrix capable of being melt-kneaded with the dry powder (DP) of the copolymer (A), and includes a hard polymer-forming monomer having a glass transition temperature of 60° C. or higher. The matrix resin (B) preferably has a glass transition temperature of 80 to 160° C., more preferably 90 to 150° C. Within this range, molding processability may be further improved.

In this description, glass transition temperature may be measured at a heating rate of 10° C./min using a differential scanning calorimeter (TA Instruments Q100 DSC) according to ASTM D 3418.

In this description, the alkyl methacrylate may be, for example, an alkyl methacrylate containing an alkyl group having 1 to 15 carbon atoms. As a specific example, the alkyl methacrylate may include one or more selected from the group consisting of methyl methacrylate, ethyl methacrylate, butyl methacrylate, 2-ethylbutyl methacrylate, 2-ethylhexyl methacrylate, and lauryl methacrylate, and is preferably an alkyl methacrylate containing a chain alkyl group having 1 to 4 carbon atoms.

The alkyl methacrylate included in the matrix resin may be preferably methyl methacrylate. In this case, molding processability and property balance between other properties are further improved.

Each of the aromatic vinyl compound and vinyl cyanide compound included in the matrix resin may be appropriately selected within the same range as those referred regarding the copolymer (A).

The matrix resin (B) may be prepared by a commonly known method. When preparing the matrix resin (B), one or more of an initiator, a crosslinking agent, and a molecular weight modifier may be included when necessary. The matrix resin (B) may be prepared by suspension polymerization, emulsion polymerization, bulk polymerization, or solution polymerization.

Materials required for reaction such as solvents and emulsifiers or conditions such as polymerization temperature and polymerization time, which are to be added or changed according to polymerization methods, may be appropriately selected without particular limitation when the materials and the conditions are generally applicable depending on a polymerization method selected for the preparation of a matrix resin.

As another example, a commercially available matrix resin may be used as the matrix resin (B).

Thermoplastic Resin

Based on 100% by weight in total of the thermoplastic resin of the present invention, the thermoplastic resin may include 50 to 100% by weight of the copolymer (A) and 0 to 50% by weight of the matrix resin (B), preferably 60 to 100% by weight of the copolymer (A) and 0 to 40% by weight of the matrix resin (B), more preferably 60 to 90% by weight of the copolymer (A) and 10 to 40% by weight of the matrix resin (B). Within this range, impact resistance, fluidity, and non-whitening properties may be excellent.

For example, the total content of the alkyl acrylate included in 100% by weight in total of the thermoplastic resin may be 20 to 50% by weight, preferably 22 to 50% by weight, more preferably 25 to 50% by weight. Within this range, impact strength and non-whitening properties may be excellent without deterioration in weather resistance.

In this description, the total content of the alkyl acrylate included in 100% by weight in total of the thermoplastic resin may be calculated, for example, by summing the weights (parts by weight) of alkyl acrylate compounds fed to prepare the thermoplastic resin. As another example, the total content of the alkyl acrylate may be quantitatively determined by subjecting the thermoplastic resin to nuclear magnetic resonance (NMR) analysis or Fourier transform infrared spectroscopy (FT-IR) analysis.

In this description, NMR analysis means analysis by $^1$H NMR unless otherwise specified.

In this description, NMR analysis may be performed according to a method commonly practiced in the art, and a specific measurement example is as follows.

Equipment name: Bruker 600 MHZ NMR (AVANCE III HD) CPP BB (1H 19F tunable and broadband, with z-gradient) Prodigy Probe Measurement conditions: $^1$H NMR (zg30): ns=32, d1=5s, TCE-d2, at room temp.

In this description, FT-IR analysis may be performed according to a method commonly practiced in the art, and a specific measurement example is as follows.

Equipment name: Agilent Cary 660

Measurement conditions: ATR mode

The thermoplastic resin has excellent transparency (haze value) of less than 5% measured according to ASTM D-1003, when injected into a specimen having a thickness of 3 mm. The transparency may be preferably 0.1% to 4.0%, more preferably 0.1% to 3.5%.

The haze of the thermoplastic resin can be measured using a method known in the related art for measuring transparency. Particularly, the haze may be measured according to ASTM D1003. As a particular example, a haze value (haze) of a specimen (thickness: 3 mm) injected at a barrel temperature of 220° C. may be measured at 23° C. according to ASTM D1003 using a haze meter (model name: HM-150) manufactured by MURAKAMI Co.

The thermoplastic resin may have an X value of 65% or more, preferably 65 to 150%, more preferably 68 to 140% as calculated by Equation 1 below through the limited composition as described above. Within this range, non-whitening properties may be further improved.

$$X(\%) = \{(G-Y)/Y\} \times 100 \qquad \text{[Equation 1]}$$

In Equation 1, G represents the total gel content (%) of the thermoplastic resin, and Y represents the content (% by weight) of alkyl acrylate in the gel of the thermoplastic resin.

In Equation 1, the content of alkyl acrylate in the gel of the thermoplastic resin represents the content (based on 100% by weight in total of the fed thermoplastic resin) of the alkyl acrylate in insoluble matter (gel) obtained in the process of determining gel content. Here, the gel content represents the content of the insoluble matter based on 100% by weight in total of the thermoplastic resin.

When elution of the thermoplastic resin is performed using acetone, the elution amount of alkyl acrylate is preferably 0.1% by weight or more, more preferably 0.5% by weight or more, as a preferred example, 0.1 to 15% by weight, as a more preferred example, 0.5 to 15% by weight. Within this range, non-whitening properties may be excellent.

In this description, when measuring the elution amount of alkyl acrylate using acetone, 30 g of acetone is added to 0.5 g of dry powder of a thermoplastic resin, agitation is performed at 210 rpm at room temperature for 12 hours using a shaker (SKC-6075, Lab Companion Co.), centrifugation is performed at 18,000 rpm at 0° C. for 3 hours using a centrifuge (Supra R30, Hanil Science Co.) to obtain an acetone solution from which insoluble matter is separated, and the obtained acetone solution is dried in a forced circulation manner at 85° C. for 12 hours using a forced convection oven (OF-12GW, Lab Companion Co.) to obtain a resin sol. Then, NMR analysis or FT-IR analysis is performed on the resin sol to quantitatively determine the elution amount of an alkyl acrylate.

For example, a difference of refractive index (according to ASTM D542) between a sol and a gel of the thermoplastic resin under a condition of using acetone may be less than 0.025, preferably 0.001 or more and less than 0.020, more preferably 0.001 or more and less than 0.017. Within this range, the haze of the thermoplastic resin is further lowered without deterioration of other physical properties, thereby providing excellent transparency.

In the description, the refractive index difference between a sol and a gel can be obtained by as follows: 30 g of acetone is added to 0.5 g of dry powder of the thermoplastic resin, agitation is performed at 210 rpm at room temperature for 12 hours using a shaker (SKC-6075, Lab Companion Co.), centrifugation is performed at 18,000 rpm at 0° C. for 3 hours using a centrifuge (Supra R30, Hanil Science Co.) to obtain an acetone solution from which insoluble matter is separated, and then, the dissolved portion is dried in a forced circulation manner at 85° C. for 12 hours using a forced convection oven (OF-12GW, Lab Companion Co.) to obtain a sol, and the separated insoluble matter is dried in a forced circulation manner at 85° C. for 12 hours using a forced convection oven (OF-12GW, Lab Companion Co.) to obtain a gel. Then, a refractive index of each of the sol and the gel is measured according to ASTM D542. The present invention can provide a thermoplastic resin having more improved transparency by controlling a refractive index difference between a sol and a gel within the above range.

In this description, the refractive index may be measured using an Abbe refractometer at 25° C. according to ASTM D542.

The thermoplastic resin of the present invention has excellent whitening resistance when bending or folding. For example, when the thermoplastic resin is extruded into a film having a width and length of 100 mm×100 mm and a thickness of 0.15 mm and the film is bent at 180° at a temperature of 23° C., whitening does not occur, indicating that non-whitening properties are excellent.

In addition, the thermoplastic resin of the present invention has excellent whitening resistance against external impact (hit). For example, when the thermoplastic resin is extruded into a film having a thickness of 0.15 mm and a weight having a weight of 1 kg is vertically dropped onto the film from a height of 100 mm at a temperature of 23° C. using a Gardner impact tester, a difference in haze values measured before and after impact according to ASTM D1003-95 for an area impacted by the weight may be 10 or less, preferably 5 or less, more preferably 3 or less. In this case, when bending or external impact is applied, whitening is significantly reduced, and thus problems such as inhibition of expression of intrinsic color due to whitening, deterioration of appearance quality, and reduction of luxuriousness may be prevented, thereby providing a molded article having excellent appearance quality.

In this description, specifically, when a difference in haze values before and after impact is measured, impact is applied to the middle portion of a film having a thickness of 0.15 mm and a width and length of 100 mm×100 mm using a weight (Falling Weight 1 kg, Cat. No. 1249) and using a Gardner impact tester (Impact Tester 5545, BYK Gardner Co.), haze values before and after impact are measured for the middle portion of the film, and a difference in haze values before and after impact is calculated based the measured values.

The haze value before and after impact may be measured using a method known for measuring transparency in the related field, and in detail, may be measured according to ASTM D1003. As a specific example, the haze value of a film extruded at an extrusion temperature of 230° C. may be measured at 23° C. using a haze meter (model name: HM-150, MURAKAMI Co.) according to ASTM D1003.

For example, the thermoplastic resin may have a gloss of 120 or more, preferably 125 to 160, more preferably 130 or 160, still more preferably 135 to 160 as measured at an incidence angle of 60° according to ASTM D528. Within this range, gloss may be excellent without deterioration in other physical properties, thereby providing a molded article having excellent appearance quality.

For example, the thermoplastic resin may have a melt index (MI) of 5 or more, preferably 6 to 20, more preferably 7 to 20 as measured according to ASTM D1238. Within this range, molding processability may be excellent without deterioration in other physical properties.

In this description, a melt index may be measured at a temperature of 220° C. for a reference time of 10 minutes under a load of 10 kg according to ASTM D1238. As a particular example, a specimen is heated to 220° C. using a melt indexer (GOETTFERT Co.), the specimen is placed in the cylinder of the melt indexer, and a load of 10 kg is applied with a piston. At this time, the weight (g) of a resin melted and flowing out for 10 minutes is measured, and a melt index is calculated based on the measured value.

Method of Preparing Thermoplastic Resin

A method of preparing the thermoplastic resin of the present invention includes a step of kneading and extruding 50 to 100% by weight of an alkyl acrylate-aromatic vinyl compound-vinyl cyanide compound graft copolymer (A) and 0 to 50% by weight of a matrix resin (B) including one or more selected from the group consisting of an aromatic vinyl compound-vinyl cyanide compound-alkyl methacrylate copolymer, and an alkyl methacrylate polymer, wherein the thermoplastic resin prepared to have a thickness of 3 mm has a transparency (haze value) of less than 5% measured according to ASTM D-1003 and has an X value of 65% or more as measured by Equation 1 below. In this case, molding processability, transparency, gloss, and non-whitening properties may be excellent while maintaining mechanical properties to be equal to those of conventional ASA based resins, thereby providing excellent appearance quality.

$$X(\%)=\{(G-Y)/Y\}\times 100 \qquad \text{[Equation 1]}$$

In Equation 1, G represents the total gel content (%) of the thermoplastic resin, and Y represents the content (% by weight) of alkyl acrylate in the gel of the thermoplastic resin.

The copolymer (A) used in the preparation of the thermoplastic resin may be prepared by the method of preparing the copolymer (A). In this case, grafting degree and molecular weight may be properly adjusted, and thus molding processability and non-whitening properties may be excellent.

When the thermoplastic resin of the present invention is prepared, in the step of kneading and extruding, when necessary, one or more selected from the group consisting of a lubricant, a heat stabilizer, an antioxidant, a light stabilizer, a ultraviolet light stabilizer, a light stabilizer, a dye, a pigment, a colorant, a release agent, an antistatic agent, an antibacterial agent, a processing aid, a compatibilizer, a metal deactivator, a flame retardant, a smoke suppressant, an anti-drip agent, a foaming agent, a plasticizer, a reinforcing agent, a filler, a matting agent, an anti-friction agent, and an anti-wear agent may be further included in an amount of 0.01 to 5 parts by weight, 0.05 to 3 parts by weight, 0.05 to 2 parts by weight, or 0.05 to 1 part by weight based on 100 parts by weight in total of the copolymer (A) and the matrix resin (B). Within this range, required physical properties may be implemented without deterioration in the intrinsic physical properties of an ASA resin composition.

For example, the lubricant may include one or more selected from ethylene bis stearamide, polyethylene oxide wax, magnesium stearate, calcium stearamide, and stearic acid, without being limited thereto.

For example, the antioxidant may include phenolic antioxidants, phosphorus antioxidants and the like, without being limited thereto.

For example, the light stabilizer may include HALS-based light stabilizers, benzophenone-based light stabilizers, benzotriazol-based light stabilizers and the like, without being limited thereto.

For example, the antistatic agent may include one or more of anionic surfactants, nonionic surfactants and the like, without being limited thereto.

For example, the release agent may include one or more selected from glyceryl stearate, polyethylene tetra stearate and the like, without being limited thereto.

Molded Article

A molded article of the present invention includes the thermoplastic resin of the present invention having excellent non-whitening properties. In this case, weather resistance, impact resistance, molding processability, gloss, and whitening resistance may be excellent, thereby providing excellent appearance quality. Thus, the molded article may be applied to film or sheet products.

For example, the molded article may be a finishing material. In this case, non-whitening properties may be excellent, and thus appearance quality may be excellent.

Hereinafter, the present invention will be described in more detail with reference to the following preferred examples. However, these examples are provided for illustrative purposes only and should not be construed as limiting the scope and spirit of the present invention. In addition, it will be apparent to those skilled in the art that various changes and modifications may be made without departing from the spirit and scope of the present invention, and such changes and modifications are also within the scope of the appended claims.

EXAMPLES

In the following examples, the X value calculated by Equation 1 is described as "alkyl acrylate coverage" for convenience.

Example 1

<Rubber Seed Preparation Step>

30 parts by weight of distilled water, 4.25 parts by weight of butyl acrylate, 0.75 parts by weight of styrene, 0.4 parts by weight of sodium dodecyl sulfate, 0.1 parts by weight of ethylene glycol dimethacrylate, 0.05 parts by weight of allyl methacrylate, 0.1 parts by weight of sodium hydrogen carbonate, and 80 parts by weight of distilled water were fed into a nitrogen-substituted reactor batchwise, temperature was raised to 70° C., and then 0.1 parts by weight of potassium persulfate was added thereto to initiate reaction. Then, polymerization was performed for 1 hour.

<Rubber Core Preparation Step>

43 parts by weight of distilled water, 34 parts by weight of butyl acrylate, 6 parts by weight of styrene, 1.0 part by weight of sodium dodecyl sulfate, 0.4 parts by weight of ethylene glycol dimethacrylate, 0.5 parts by weight of allyl methacrylate, 30 parts by weight of distilled water, and 0.1 parts by weight of potassium persulfate were mixed with the rubber seed, and the mixture was continuously fed into a reactor at 70° C. for 2.0 hours. After feeding, polymerization was further performed for 1 hour.

After completion of the reaction, the average particle size of the obtained rubber polymer (the rubber seed and the rubber core including the rubber seed) was 90 nm.

<Copolymer Shell Preparation Step>

A mixture homogeneously containing 27 parts by weight of distilled water, 40 parts by weight of styrene, 11.2 parts by weight of acrylonitrile, 3.8 parts by weight of butyl acrylate, 1.5 parts by weight of potassium rosinate as an emulsifier, 0.05 parts by weight of tert-dodecyl mercaptan, and 0.1 parts by weight of cumene hydroperoxide as an initiator and a mixed solution containing 0.09 parts by weight of sodium pyrophosphate as an activator, 0.12 parts by weight of dextrose, and 0.002 parts by weight of ferrous sulfide respectively were continuously fed into the reactor containing the core at 75° C. for 3 hours to perform polymerization. After completion of the continuous feed, polymerization was further performed at 75° C. for 1 hour, and temperature was cooled to 60° C. to terminate and prepare graft copolymer latex.

After completion of the reaction, the grafting degree of the obtained graft copolymer was 85%, and the weight average molecular weight of the shell was 83,000 (g/mol).

<Graft Copolymer Powder Preparation>

1.0 part by weight of an aqueous calcium chloride solution was added to the prepared acrylate graft copolymer latex, coagulation was performed at 60 to 85° C. under atmospheric pressure, aging was performed at 70 to 95° C., dehydration and washing were performed, and then drying was performed with hot blast at 85° C. for 2 hours to obtain graft copolymer powder.

<Thermoplastic Resin Preparation>

70 parts by weight of the graft copolymer powder, 30 parts by weight of a methyl methacrylate polymer (BA611 manufactured by LGMMA) as a matrix resin, 1.5 parts by weight of a lubricant, 1.0 part by weight of an antioxidant, and 1.5 parts by weight of an ultraviolet light stabilizer were added and mixed. The mixture was introduced into a 36 pie extrusion kneader at a cylinder temperature of 220° C. to prepare pellets. The prepared pellets were injected using an injection machine at a barrel temperature of 220° C. to prepare a specimen for measuring physical properties such as impact strength.

The butyl acrylate (BA) content of the prepared thermoplastic resin was 29.5% (wt %), an alkyl acrylate coverage value was 103.4%, and the elution amount of BA in a resin sol was 1.97%.

<Thermoplastic Resin Film Preparation>

The thermoplastic resin pellets were introduced into a 20 pi single extrusion kneader equipped with a T-die at a cylinder temperature of 230° C. to prepare a film having a thickness of 0.15 μm.

Example 2

Preparation processes were performed in the same manner as in Example 1, except that when preparing a thermoplastic resin, 30 parts by weight of a styrene-acrylonitrile-methyl methacrylate copolymer (XT500, LG Chemical Co.) as a matrix resin was used.

The BA content in the prepared thermoplastic resin was 29.5%, an alkyl acrylate coverage value was 103.4%, and the elution amount of BA in a resin sol was 1.97%.

Example 3

Preparation processes were performed in the same manner as in Example 1, except that, 3.75 parts by weight of butyl acrylate and 1.25 parts by weight of styrene were used when preparing a rubber seed, 18.75 parts by weight of butyl acrylate and 6.25 parts by weight of styrene were used when preparing a rubber core, and 46.5 parts by weight of styrene, 13 parts by weight of acrylonitrile, 10.5 parts by weight of butyl acrylate were used when preparing a shell.

An average particle size of the obtained rubber polymer was 90 nm, a grafting degree of the graft copolymer was 99%, and a weight average molecular weight of the shell was 80,000.

The BA content of the resin was 23.1%, an alkyl acrylate coverage value was 99.3%, and the elution amount of BA in a resin sol was 7.27%.

Example 4

A graft copolymer was prepared in the same manner as in Example 1, except that 29.75 parts by weight of butyl acrylate and 5.25 parts by weight of styrene were used when preparing a rubber core, 43.6 parts by weight of styrene, 12.2 parts by weight of acrylonitrile, and 4.2 parts by weight of butyl acrylate were used when preparing a copolymer shell.

A thermoplastic resin was prepared in the same manner as in Example 1, except that 80 parts by weight of the graft copolymer and 20 parts by weight of the matrix resin were used.

The average particle size of the obtained rubber polymer was 90 nm, the grafting degree of the graft copolymer was 105%, and the weight average molecular weight of the shell was 81,000. The BA content of the resin was 30.6%, an alkyl acrylate coverage value was 122%, and the elution amount of BA in a resin sol was 2.93%.

Example 5

A graft copolymer was prepared in the same manner as in Example 1, except that 38.25 parts by weight of butyl acrylate and 6.75 parts by weight of styrene were used when preparing a rubber core, and 36.3 parts by weight of styrene, 10.2 parts by weight of acrylonitrile, and 3.5 parts by weight of butyl acrylate were used when preparing a copolymer shell.

A thermoplastic resin was prepared in the same manner as in Example 1, except that 50 parts by weight of the graft copolymer and 50 parts by weight of the matrix resin were used.

The average particle size of the obtained rubber polymer was 90 nm, the grafting degree of the graft copolymer was 66%, and the weight average molecular weight of the shell was 78,000.

The BA content of the resin was 23.0%, an alkyl acrylate coverage value was 85.2%, and the elution amount of BA in a resin sol was 1.02%.

Example 6

Preparation processes were performed in the same manner as in Example 1, except that 4.5 parts by weight of butyl acrylate and 0.5 parts by weight of styrene were used when preparing a rubber seed, and 36 parts by weight of butyl acrylate and 4 parts by weight of styrene were used when preparing a rubber core.

The average particle size of the obtained rubber polymer was 90 nm, the grafting degree of the graft copolymer was 82%, and the weight average molecular weight of the shell was 89,000.

The BA content of the resin was 31.0%, an alkyl acrylate coverage value was 90.1%, and the elution amount of BA in a resin sol was 2.08%.

Example 7

Preparation processes were performed in the same manner as in Example 1, except that 4.0 parts by weight of butyl acrylate and 1.0 part by weight of styrene were used when preparing a rubber seed, and 32 parts by weight of butyl acrylate and 8 parts by weight of styrene were used when preparing a rubber core.

The average particle size of the obtained rubber polymer was 90 nm, the grafting degree of the graft copolymer was 78%, and the weight average molecular weight of the shell was 95,000.

The BA content of the resin was 27.9%, an alkyl acrylate coverage value was 108.3%, and the elution amount of BA in a resin sol was 2.22%.

Example 8

Preparation processes were performed in the same manner as in Example 1, except that 2.0 parts by weight of sodium dodecyl sulfate was used when preparing a rubber seed.

The average particle size of the obtained rubber polymer was 50 nm, the grafting degree of the graft copolymer was 74%, and the weight average molecular weight of the shell was 72,000.

The BA content of the resin was 29.4%, an alkyl acrylate coverage value was 93.0%, and the elution amount of BA in a resin sol was 2.35%.

Example 9

Preparation processes were performed in the same manner as in Example 1, except that 0.25 parts by weight of sodium dodecyl sulfate was used when preparing a rubber seed.

The average particle size of the obtained rubber polymer was 110 nm, the grafting degree of the graft copolymer was 93%, and the weight average molecular weight of the shell was 101,000.

The BA content of the resin was 29.5%, an alkyl acrylate coverage value was 110.9%, and the elution amount of BA in a resin sol was 1.64%.

Example 10

A graft copolymer was prepared in the same manner as in Example 1, except that 3.75 parts by weight of butyl acrylate and 1.25 parts by weight of styrene were used when preparing a rubber seed, 18.75 parts by weight of butyl acrylate and 6.25 parts by weight of styrene were used when preparing a rubber core, and 45.04 parts by weight of styrene, 12.57 parts by weight of acrylonitrile, and 12.39 parts by weight of butyl acrylate were used when preparing a copolymer shell.

A thermoplastic resin was prepared in the same manner as in Example 1, except that 100 parts by weight of the graft copolymer were used without using a matrix resin.

The average particle size of the obtained rubber polymer was 90 nm, the grafting degree of the graft copolymer was 150%, and the weight average molecular weight of the shell was 83,000.

The BA content of the resin was 34.9%, an alkyl acrylate coverage value was 146.18%, and the elution amount of BA in a resin sol was 17.7%.

Comparative Example 1

Preparation processes were performed in the same manner as in Example 1, except that when preparing a thermoplastic resin, 30 parts by weight of a styrene-acrylonitrile resin (S95RF, LG Chemical Co.) as a matrix resin was used.

The BA content of the resin was 29.5%, an alkyl acrylate coverage value was 103.4%, and the elution amount of BA in a resin sol was 1.97%.

Comparative Example 2

Preparation processes were performed in the same manner as in Example 1, except that 4.5 parts by weight of butyl acrylate and 0.5 parts by weight of styrene were used when preparing a rubber seed, 49.5 parts by weight of butyl acrylate and 5.5 parts by weight of styrene were used when preparing a rubber core, and 29.1 parts by weight of styrene, 8.1 parts by weight of acrylonitrile, and 2.8 parts by weight of butyl acrylate were used when preparing a copolymer shell.

The average particle size of the obtained rubber polymer was 90 nm, the grafting degree of the graft copolymer was 50%, and the weight average molecular weight of the shell was 75,000.

The BA content of the resin was 39.8%, an alkyl acrylate coverage value was 60.4%, and the elution amount of BA in a resin sol was 1.32%.

Comparative Example 3

A graft copolymer was performed in the same manner as in Example 1, except that 3.5 parts by weight of butyl acrylate and 1.5 parts by weight of styrene were used when preparing a rubber seed, 14 parts by weight of butyl acrylate and 6 parts by weight of styrene were used when preparing a rubber core, and 54.5 parts by weight of styrene, 15.2 parts by weight of acrylonitrile, and 5.3 parts by weight of butyl acrylate were used when preparing a copolymer shell.

A thermoplastic resin was prepared in the same manner as in Example 1, except that 50 parts by weight of the graft copolymer and 50 parts by weight of the matrix resin were used.

The average particle size of the obtained rubber polymer was 90 nm, the grafting degree of the graft copolymer was 143%, and the weight average molecular weight of the shell was 78,000.

The BA content of the resin was 11.4%, an alkyl acrylate coverage value was 203.7%, and the elution amount of BA in a resin sol was 1.97%.

Comparative Example 4

Preparation processes were performed in the same manner as in Example 1, except that 4.75 parts by weight of butyl acrylate and 0.25 parts by weight of styrene were used when preparing a rubber seed, 52.25 parts by weight of butyl acrylate and 2.75 parts by weight of styrene were used when preparing a rubber core, 29.1 parts by weight of styrene, 8.1 parts by weight of acrylonitrile, and 2.8 parts by weight of butyl acrylate were used when preparing a copolymer shell, and 85 parts by weight of the graft copolymer and 15 parts by weight of the matrix resin were used when preparing a thermoplastic resin.

The average particle size of the obtained rubber polymer was 96 nm, the grafting degree of the graft copolymer was 40%, and the weight average molecular weight of the shell was 83,000.

The BA content of the resin was 50.8%, an alkyl acrylate coverage value was 43.2%, and the elution amount of BA in a resin sol was 3.33%.

TEST EXAMPLES

The physical properties of the specimens and films prepared in Examples 1 to 10 and Comparative Examples 1 to 4 were measured according to the following methods, and the results are shown in Tables 1 and 2 below.

DLS average particle diameter: 0.1 g of the prepared rubber latex (solids content: 35 to 50% by weight) was diluted with 100 g of deionized water to prepare a sample, the particle diameter of the sample was measured at 23° C. by dynamic light scattering under an intensity value of 300 kHz in an intensity-weighted Gaussian analysis mode using a particle size analyzer (Nicomp CW380, PPS Co.), and the average value of hydrodynamic diameters obtained from scattering intensity distribution was obtained as a DLS average particle diameter.

Grafting degree (%): 30 g of acetone was added to 0.5 g of dry powder of the prepared graft polymer, agitation was performed at 210 rpm at room temperature (23° C.) for 12 hours using a shaker (SKC-6075, Lab Companion Co.), centrifugation was performed at 18,000 rpm at 0° C. for 3 hours using a centrifuge (Supra R30, Hanil Science Co.) to separate only insoluble matter that was not dissolved in acetone, and the separated insoluble matter was dried in a forced circulation manner at 85° C. for 12 hours using a forced convection oven (OF-12GW, Lab Companion Co.). Then, the weight of the dried insoluble matter was measured, and grafting degree was calculated by Equation 3 below.

Grafting degree(%)=[Weight (g) of grafted monomers/Weight (g) of rubber]×100     [Equation 3]

In Equation 3, the weight of grafted monomers is a value obtained by subtracting the weight (g) of rubber from the weight of insoluble matter (gel) obtained by dissolving a graft copolymer in acetone and performing centrifugation, and the weight (g) of rubber is the amount (parts by weight) of rubber components theoretically included in the graft copolymer powder. Here, the parts by weight of the rubber means the total sum of parts by weights of unit components fed when preparing a rubber seed and a core.

Weight average molecular weight (g/mol) of shell: A portion (sol) dissolved in acetone obtained when measuring the grafting degree was dissolved in a THF solvent, and then the weight average molecular weight of a shell was obtained as a relative value to a polystyrene (PS) standard specimen using a GPC. Specific measurement conditions are as follows.

Solvent: tetrahydrofuran (THF)
Column temperature: 40° C.
Flow rate: 0.3 mL/min
Sample concentration: 20 mg/mL
Injection amount: 5 μl
Column model: 1×PLgel 10 μm MiniMix-B (250×4.6 mm)+1× PLgel 10 μm MiniMix-B (250×4.6 mm)+1× PLgel 10 μm MiniMix-B Guard (50×4.6 mm)
Equipment name: Agilent 1200 series system
Refractive index detector: Agilent G1362 RID
RI temperature: 35° C.
Data processing: Agilent ChemStation S/W
Test method: Measuring according to OECD TG 118
BA content 18 by weight): BA content was quantitatively measured by $^1$H NMR analysis or FT-IR analysis. Specific measurement conditions are as follows.

$^1$H NMR
Equipment name: Bruker 600 MHZ NMR (AVANCE III HD) CPP BB (1H 19F tunable and broadband, with z-gradient) Prodigy Probe
Measurement conditions: $^1$H NMR (zg30): ns=32, d1=5s, TCE-d2, at room temp.

FT-IR
Equipment name: Agilent Cary 660
Measurement conditions: ATR mode

Gel content: 30 g of acetone was added to 0.5 g of dry powder of the prepared thermoplastic resin, agitation was performed at 210 rpm at room temperature for 12 hours using a shaker (SKC-6075, Lab Companion Co.), centrifugation was performed at 18,000 rpm at 0° C. for 3 hours using a centrifuge (Supra R30, Hanil Science Co.) to separate only insoluble matter that was not dissolved in acetone, and the separated insoluble matter was dried in a forced circulation manner at 85° C. for 12 hours using a forced convection oven (OF-12GW, Lab Companion Co.) to get gel. Then, the weight of the gel was measured, and gel content was calculated by Equation 2 below.

Gel content(%)=[Weight of insoluble matter (gel)/Weight of sample]×100     [Equation 2]

Alkyl acrylate coverage (%): Alkyl acrylate coverage was calculated by Equation 1 below.

$X(\%)=\{(G-Y)/Y\}\times 100$     [Equation 1]

In Equation 1, G represents the total gel content (%) of the thermoplastic resin, and Y represents the content (% by weight) of alkyl acrylate in the gel. Here, the content (% by weight) of alkyl acrylate in the gel was quantitatively measured using an $^1$H NMR analyzer or FT-IR.

Elution amount of alkyl acrylate (% by weight): 30 g of acetone was added to 0.5 g of dry powder of a thermoplastic resin, agitation was performed at 210 rpm at room temperature for 12 hours using a shaker (SKC-6075, Lab Companion Co.), centrifugation was performed at 18,000 rpm at 0° C. for 3 hours using a centrifuge (Supra R30, Hanil Science Co.) to obtain an acetone solution from which insoluble matter was separated, and the obtained acetone solution was dried in a forced circulation manner at 85° C. for 12 hours using forced convection oven (OF-12GW, Lab Companion Co.) to obtain a resin sol. Then,]1H NMR analysis or FT-IR analysis was performed on the resin sol to quantitatively determine the elution amount of alkyl acrylate.

Refractive index: The refractive index of each of the gel obtained by the gel content measurement method and the sol obtained by the alkyl acrylate elution amount measurement method was measured at 25° C. using the Abbe refractometer according to ASTM D542, to obtain a refractive index difference (ΔRI).

Impact strength (¼"; kgf·cm/cm): Impact strength was measured at a temperature of 23° C. according to ASTM D256.

Melt index (MI): A melt index was measured at a temperature of 220° C. under a load of 10 kg according to ASTM D1238. Specifically, a specimen was heated to 220° C. using a melt indexer (GOETTFERT Co.), the specimen was placed in the cylinder of the melt indexer, and a load of 10 kg was applied with a piston. At this time, the weight (g) of a resin melted and flowing out for 10 minutes was measured, and a melt index was calculated based on the measured value.

Surface gloss (%): Surface gloss was measured at an incidence angle of 60° at a temperature of 23° C. using a gloss meter (VG7000, NIPPON DENSHOKU Co.) according to ASTM D528.

Transparency (haze): The haze value of an injection specimen having a thickness of 3 mm was measured according to ASTM D-1003 at 23° C. using a haze meter (model name: HM-150) manufactured by MURAKAMI Co.

Whitening: When the prepared film was bent at 180° in the longitudinal direction (MD) and the transverse direction (TD), whether whitening occurred was determined by visual observation (bending-caused whitening).

In addition, a film having a thickness of 0.15 mm and a width and length of 100 mm×100 mm was prepared. Then, a weight having a weight of 1 kg (Cat No. 1249, Falling Weight 1 kg) was vertically dropped onto the film from a height of 100 mm at a temperature of 23° C. using a Gardner impact tester (Impact Tester 5545, BYK Gardner Co.), haze values before and after impact were measured for the middle portion of the film impacted by the weight according to ASTM D1003-95, and a difference in haze values was calculated by Equation 5 below (dropping-caused whitening).

Difference in haze values=Haze value after dropping−Haze value before dropping     [Equation 5]

Referring to Tables 1 and 2, in the case of bending-caused whitening, when whitening occurs, it is marked as "O". When whitening does not occur (non-whitening), it was marked as "X". In the case of dropping-caused whitening, the haze difference values calculated by Equation 5 are shown.

In this case, haze was measured at a temperature of 23° C. using a haze meter (model name: HM-150, MURAKAMI Co.) according to ASTM D1003-95.

In addition, FIG. 2 includes images taken after hitting, using a Gardner impact tester, films manufactured in an example (left image) and a comparative example (right image) to check whether whitening occurs. As shown in FIG. 2, similar to FIG. 1, whitening does not occur at the hit portion, indicating that the example according to the present invention has non-whitening properties. However, in the case of the comparative example outside the scope of the present invention, whitening occurs clearly at the hit portion.

TABLE 1

| Classification | BA content in resin (%) | BA coverage % | Melt index [g/10 min] | Impact strength [kg·cm/cm] | Film gloss | Whitening TD | Whitening MD | Dropping | Transparency Haze | Transparency ΔRI |
|---|---|---|---|---|---|---|---|---|---|---|
| Example 1 | 29.5 | 103.4 | 9.9 | 4.8 | 141.4 | X | X | 2.5 | 3.23 | 0.0103 |
| Example 2 | 29.5 | 103.4 | 10.1 | 5.1 | 129.1 | X | X | 2.7 | 2.82 | 0.0068 |
| Example 3 | 23.1 | 99.3 | 6.5 | 7.9 | 140.7 | X | X | 2.1 | 2.34 | 0.0029 |
| Example 4 | 30.6 | 122.0 | 8.1 | 6.2 | 143.1 | X | X | 3.0 | 2.46 | 0.0038 |
| Example 5 | 23.0 | 85.2 | 12.2 | 4.2 | 141.0 | X | X | 2.2 | 3.88 | 0.0157 |
| Example 6 | 31.0 | 90.1 | 9.5 | 5.9 | 140.8 | X | X | 3.0 | 2.56 | 0.0046 |
| Example 7 | 27.9 | 108.3 | 10.1 | 4.2 | 142.9 | X | X | 2.3 | 3.10 | 0.0092 |
| Example 8 | 29.5 | 93.0 | 10.7 | 4.2 | 141.4 | X | X | 2.2 | 2.34 | 0.0029 |
| Example 9 | 29.5 | 110.9 | 8.3 | 6.9 | 143.2 | X | X | 3.1 | 3.91 | 0.0159 |
| Example 10 | 34.9 | 146.18 | 5.5 | 8.5 | 130.1 | X | X | 2.9 | 4.63 | 0.0236 |

TABLE 2

| Classification | BA content in resin (%) | BA coverage % | Melt index [g/10 min] | Impact strength [kg·cm/cm] | Film gloss | Whitening TD | Whitening MD | Dropping | Transparency Haze | Transparency ΔRI |
|---|---|---|---|---|---|---|---|---|---|---|
| Comparative Example 1 | 29.5 | 103.4 | 11.2 | 5.9 | 126.9 | X | X | 3.2 | 63.07 | 0.0506 |
| Comparative Example 2 | 39.8 | 60.4 | 10.5 | 4.0 | 140.2 | O | O | 20.4 | 2.27 | 0.0023 |
| Comparative Example 3 | 11.4 | 203.7 | 6.2 | 5.2 | 144.4 | O | O | 69.2 | 10.54 | 0.0295 |
| Comparative Example 4 | 50.8 | 43.2 | 8.0 | 9.1 | 137.2 | O | O | 18.9 | 12.58 | 0.0299 |

As shown in Table 1, it can be confirmed that, compared to the thermoplastic resins (Comparative Examples 1 to 4) outside the scope of the present invention, the thermoplastic resins (Examples 1 to 10) according to the present invention have excellent impact strength, gloss, and fluidity (molding processability), and exhibit excellent transparency due to a small refractive index difference of less than 0.025 between the sol and the gel, without bending-caused whitening. In addition, in the case of the thermoplastic resins according to the present invention, a difference between haze values before and after hitting is 4 or less, indicating that non-whitening properties are excellent.

FIG. 1 includes images taken after bending, in the Md and Td directions, films manufactured in an example (left image) and a comparative example (right image) to check whether whitening occurs. As shown in FIG. 1, in the case of the example according to the present invention, whitening does not occur at the bent portion, indicating that the example according to the present invention has non-whitening properties. However, in the case of the comparative example outside the scope of the present invention, whitening occurs clearly at the bent portion.

The invention claimed is:

1. A thermoplastic resin, comprising:
an alkyl acrylate-aromatic vinyl compound-vinyl cyanide compound graft copolymer (A), or
the copolymer (A) and a matrix resin (B) comprising one or more selected from the group consisting of an aromatic vinyl compound-vinyl cyanide compound-alkyl methacrylate copolymer and an alkyl methacrylate polymer,
wherein a transparency (haze), measured according to ASTM D-1003 under a condition of 3 mm thickness, is less than 5%,
a total content of the alkyl acrylate is from 20 to 50% by weight,
an alkyl acrylate coverage value (X) as calculated by Equation 1 below is 65 or more:

$$X = \{(G-Y)/Y\} \times 100,\quad \text{[Equation 1]}$$

wherein G represents a total gel content (%) of the thermoplastic resin, and Y represents a content (% by weight) of the alkyl acrylate in the gel of the thermoplastic resin, and wherein, based on 100% by weight in total of the copolymer (A), the copolymer (A) comprises:
from 30 to 50% by weight of alkyl acrylate rubber (a-1) having a DLS average particle diameter of from 50 to 120 nm or a TEM average particle diameter of from 32.5 to 84 nm, and
from 50 to 70% by weight of an aromatic vinyl compound-vinyl cyanide compound copolymer (a-2).

2. The thermoplastic resin according to claim 1, wherein the copolymer (A) is present in an amount of from 50 to 100% by weight, and the matrix resin (B) is present in an amount of from 0 to 50% by weight.

3. The thermoplastic resin according to claim 1, wherein, when elution of the thermoplastic resin is performed using acetone, an elution amount of the alkyl acrylate is 0.1% by weight or more.

4. The thermoplastic resin according to claim 1, wherein the copolymer (A) has a grafting degree of from 60 to 150%, and the copolymer (a-2) has a weight average molecular weight of from 40,000 to 120,000 g/mol.

5. The thermoplastic resin according to claim 1, wherein the rubber (a-1) further comprises an aromatic vinyl compound.

6. The thermoplastic resin according to claim 5, wherein the aromatic vinyl compound is present in an amount of from 0.1 to 25% by weight based on 100% by weight in total of the rubber (a-1).

7. The thermoplastic resin according to claim 1, wherein the copolymer (a-2) further comprises an alkyl acrylate.

8. The thermoplastic resin according to claim 7, wherein the copolymer (a-2) comprises from 55 to 85% by weight of an aromatic vinyl compound, from 10 to 30% by weight of a vinyl cyanide compound, and from 0.1 to 20% by weight of an alkyl acrylate based on 100% by weight in total of the copolymer (a-2).

9. The thermoplastic resin according to claim 1, wherein a refractive index difference (according to ASTM D542) between a sol and a gel of the thermoplastic resin under a condition of using acetone is less than 0.025.

10. The thermoplastic resin according to claim 1, wherein, when the thermoplastic resin is extruded to obtain a film having a thickness of 0.15 mm, and a weight having a weight of 1 kg is vertically dropped onto the film from a height of 100 mm at a temperature of 23° C. using a Gardner impact tester, a difference in haze values measured before and after impact according to ASTM D1003-95 for an area impacted by the weight is 10 or less.

11. A method of preparing a thermoplastic resin, the method comprising:
kneading and extruding an alkyl acrylate-aromatic vinyl compound-vinyl cyanide compound graft copolymer (A), or the copolymer (A) and a matrix resin (B) comprising one or more selected from the group consisting of an aromatic vinyl compound-vinyl cyanide compound-alkyl methacrylate copolymer and an alkyl methacrylate polymer,
wherein a transparency (haze), measured according to ASTM D-1003 under a condition of 3 mm thickness, of the thermoplastic resin is less than 5%,
a total content of the alkyl acrylate in the thermoplastic resin is from 20 to 50% by weight,
an alkyl acrylate coverage value (X), as calculated by Equation 1 below, of the thermoplastic resin is 65 or more:

$$X=\{(G-Y)/Y\}\times 100,\qquad \text{[Equation 1]}$$

wherein G represents a total gel content (%) of the thermoplastic resin, and Y represents a content (% by weight) of alkyl acrylate in the gel of the thermoplastic resin, and
wherein, based on 100% by weight in total of the copolymer (A), the copolymer (A) comprises:
from 30 to 50% by weight of alkyl acrylate rubber (a-1) having a DLS average particle diameter of from 50 to 120 nm or a TEM average particle diameter of from 32.5 to 84 nm, and
from 50 to 70% by weight of an aromatic vinyl compound-vinyl cyanide compound copolymer (a-2).

12. The method according to claim 11, wherein the copolymer (A) is prepared by emulsion polymerization of 100 parts by weight in total of a monomer mixture comprising from 30 to 50 parts by weight of alkyl acrylate rubber having a DLS average particle diameter of from 50 to 120 nm or a TEM average particle diameter of from 32.5 to 84 nm and from 50 to 70 parts by weight of an aromatic vinyl compound and a vinyl cyanide compound.

13. A molded article, comprising the thermoplastic resin according to claim 1.

14. The molded article according to claim 13, wherein the molded article is a finishing material.

* * * * *